W. J. KRAMER & L. MILLER.
Horse Hay-Rakes.

No. 215,635. Patented May 20, 1879.

Attest:
J. Henry Kaiser
Walter Allen

Inventors:
W. J. Kramer, &
Lewis Miller.
By Knight Bros
Attys.

UNITED STATES PATENT OFFICE.

WILLIAM J. KRAMER AND LEWIS MILLER, OF OIL CITY, PENNSYLVANIA.

IMPROVEMENT IN HORSE HAY-RAKES.

Specification forming part of Letters Patent No. 215,635, dated May 20, 1879; application filed March 15, 1879.

*To all whom it may concern:*

Be it known that we, WILLIAM JOHN KRAMER and LEWIS MILLER, of Oil City, in the county of Venango and State of Pennsylvania, have invented new and useful Improvements in Horse Hay-Rakes, of which the following is a specification.

The subject of our invention is a two-wheeled horse hay-rake, constructed with a tubular axle, carrying the driver's seat and operating-lever, a pair of shafts attached to the lower side of the axle, a rake-frame hinged to the rear extremities of the shafts, and a revolving rake, which is held in its operative position by a gravitating hook, engaging with radial pins on the rake-head, pivoted within a bifurcated lever, which latter is fulcrumed on the central part of the rake-head, and connected by a rod with the operating-lever in such a manner that a forward movement of the operating-lever first tilts the rake to cause its teeth to catch in the ground, and then releases it to permit it to turn over and again engage with the gravitating hook.

The invention further consists in the combination, with the rake, rake-frame, and levers, of a tripping-bar, acting as hereinafter set forth, to cause the movement of the operating-lever to raise the rake-frame bodily, instead of tilting the rake.

In order that the invention may be fully understood, we will proceed to describe its construction and operation, with reference to the accompanying drawings, in which—

Figure 1:
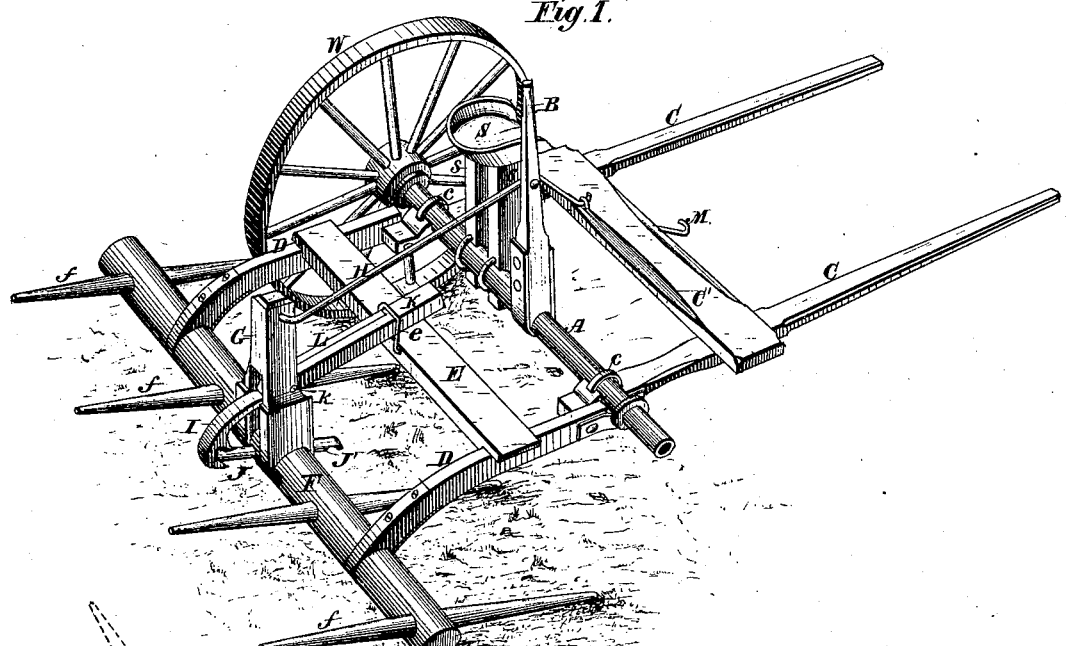
Figure 2:
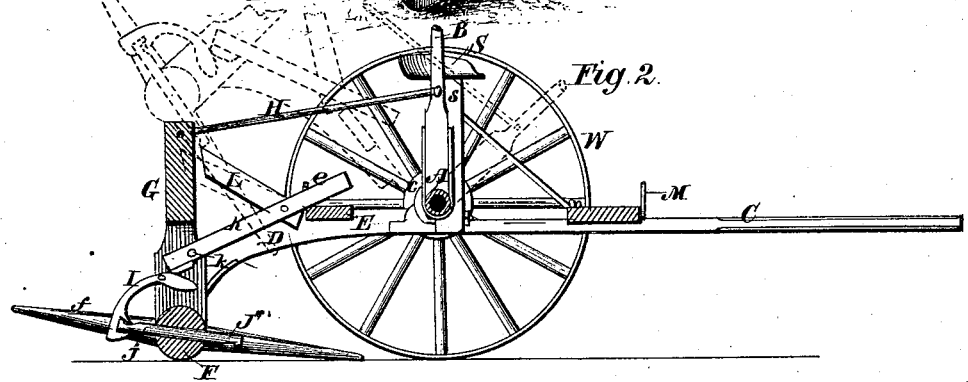
Figure 3:
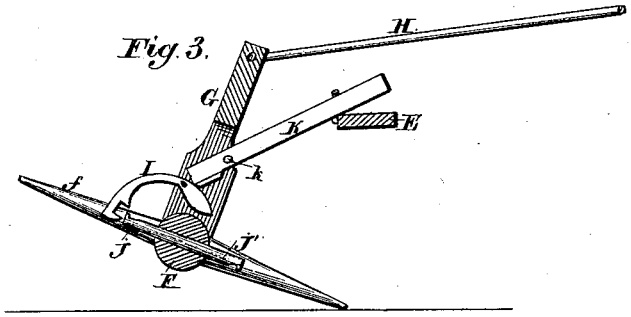

Figure 1 is a perspective view of a rake in operative position, illustrating our improvements, one wheel and portions of the shafts being omitted. Fig. 2 is a vertical longitudinal section of the same, showing the trip-bar deflected to cause the rake to rise bodily, instead of tilting. Fig. 3 is a sectional elevation, showing the rake in the act of turning.

A is a tubular axle, of wrought-iron, supported on wheels W W, which turn thereon in customary manner. To this axle is fixed, by standards $s\ s$, a driver's seat, S, and on the axle is fulcrumed an operating-lever, B. C C are the shafts, fixed beneath the axle by clips $c\ c$. The shafts extend rearward underneath the axle, and to their rear extremities are hinged the arms D D of the rake-frame, which are connected by a cross-bar, E. The rake-head F is journaled in the extremities of the arms D D, and has the straight teeth $f\ f$, common in a revolving rake. On the center of the rake-head is fulcrumed a vertical bifurcated lever, G, the upper end of which is connected, by a rod, H, with the operating-lever B. Within the bifurcated lever G is pivoted a gravitating hook, I, engaging with pins J J', projecting horizontally on opposite sides of the rake-head, so as to be caught successively by the hook as the rake is turned over. The hook I is tripped by a bar, K, pivoted at $k$ in the bifurcated lever, and extending forward so as to rest on the cross-bar E, on which it is confined by a guiding-clip, $e$. On the trip-bar K is pivoted a tongue, L, which, when deflected as shown in Fig. 2, will engage with the cross-bar E or the bifurcated lever G, so as to prevent the trip-bar K sliding thereon sufficiently to trip the hook I, and therefore causing the movement of the operating-lever to raise the rake-frame bodily.

A hook, M, on the cross-bar C' of the shafts holds the lever B, so as to retain the frame in elevated position.

The operation is as follows: The parts being in the position shown in Fig. 1, and a load having been gathered or a windrow reached, the bifurcated lever G is drawn forward by means of the operating-lever B, the first effect of which is to raise the rear side of the rake and cause its forward teeth to catch in the ground in readiness for turning. The continued forward movement of the lever G causes the rear end of the trip-bar K to press on the projecting heel of the hook I, thus withdrawing it from the pin J, and permitting the rake to turn freely when the corresponding pin J', on the other side, is caught by the gravitating hook, the levers B and G having been returned to their vertical position.

The tongue L being in the position shown in Figs. 1 and 3, the trip-bar K is permitted to thus move freely on the cross-bar E.

If the driver desires to raise the rake completely clear of the ground, he reaches back to the tongue L and turns it to the position shown in Fig. 2, when its forward end will engage with the cross-bar E, preventing the deflection of the lever G and bar K sufficiently to trip the hook I, and causing the movement of the operating-lever B, to raise the rake-frame bodily, as shown by dotted lines, Fig. 2, the lever being held by the hook M, so that the frame can be retained in its elevated position as long as desired.

Our hollow axle, made from wrought-iron tubing, is light, strong, durable, and cheap. The entire rake combines in a high and unusual degree cheapness, simplicity, and ease of operation.

By our mode of hanging the rake-frame to the shafts and attaching the latter to the bottom of the axle, we lower the connection between the shafts and the rake-frame, thereby permitting the rake to be elevated more easily than when it is attached directly to the axle, and we also provide a direct draft from the shafts.

The hook I holds the pins J J' both up and down, and the connection enables the driver to tilt the rake backward when desired, to cause it to ride easily over obstructions and prevent the catching of the teeth.

A further advantage exists in the facility in dumping afforded by partially rotating the rake by hand instead of leaving this work wholly to the horse.

It will be observed that these operations, and the hanging up of the frame to adapt the machine to be taken to or from the field, are all performed by the driver without leaving his seat.

The tongue L may, if preferred, be extended backward, as illustrated in dotted lines in Fig. 2, so as to engage with the upper part of the bifurcated lever G, which, by bracing said lever relatively to the tripping-bar K, will have the same effect as the contact of the tongue with the frame.

Having thus described our invention, the following is what we claim as new therein and desire to secure by Letters Patent:

1. The horse hay-rake herein described, having hollow wrought-iron axle A, shafts C, secured beneath said axle, rake-frame D D E, hinged to the rear extremities of said shafts, bifurcated lever G, fulcrumed to the rake-head, hook I, and lever K, carried by said lever G, operating-lever B, rod H, tongue L, and pins J J', as set forth.

2. The combination of the lever B, rod H, lever G, hook I, pins J J', and bar K, substantially as and for the purposes set forth.

3. The combination of the pins J J', hook I, bar K, and lever G, substantially as and for the purpose set forth.

4. The combination of the lever G, bar K, pivoted catch-tongue L, and cross-bar E, substantially as and for the purposes set forth.

WILLIAM JOHN KRAMER.
LEWIS MILLER.

Witnesses:
F. W. HAYS,
J. N. JAMES.